(12) United States Patent
Yan et al.

(10) Patent No.: US 6,679,149 B2
(45) Date of Patent: *Jan. 20, 2004

(54) BAND SAW APPARATUS WITH BLADE TENSIONER AND RELATED METHOD

(75) Inventors: Gongpu Yan, Troy, OH (US); Lynn Alan McGriff, Huber Heights, OH (US)

(73) Assignee: Premark FEG L.L.C., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 41 days.

(21) Appl. No.: 09/347,668

(22) Filed: Jul. 6, 1999

(65) Prior Publication Data

US 2002/0157510 A1 Oct. 31, 2002

(51) Int. Cl.[7] ................................................ B27B 13/08
(52) U.S. Cl. ........................................... 83/816; 83/814
(58) Field of Search .......................... 83/814, 816, 544, 83/545, 546, 581.1, 860, 818; 474/101, 136, 138; 30/385, 386

(56) References Cited

U.S. PATENT DOCUMENTS

| 368,731 | A | | 8/1887 | DeWitt |
| 604,081 | A | | 5/1898 | Richards |
| 2,463,437 | A | | 3/1949 | Steiner |
| 2,480,294 | A | * | 8/1949 | Hume ......................... 474/138 |
| 2,894,051 | A | | 7/1959 | Gassmann |
| 2,910,099 | A | | 10/1959 | Mall |
| 2,963,054 | A | | 12/1960 | Eschenburg |
| 3,194,284 | A | * | 7/1965 | Walker ........................ 30/386 |
| 3,889,567 | A | * | 6/1975 | Sato et al. .................... 83/816 |
| 4,321,849 | A | | 3/1982 | Athey et al. |
| 4,356,750 | A | | 11/1982 | Legler et al. |
| 4,386,545 | A | | 6/1983 | Chaconas |
| 4,576,077 | A | | 3/1986 | Titus |
| 4,803,804 | A | * | 2/1989 | Bryant ........................ 474/136 |
| 5,030,173 | A | * | 7/1991 | Bryant ........................ 474/136 |
| 5,391,118 | A | * | 2/1995 | Tsai et al. .................... 474/138 |

* cited by examiner

Primary Examiner—Stephen Choi
(74) Attorney, Agent, or Firm—Thompson Hine LLP

(57) ABSTRACT

A band saw apparatus including a blade under tension and has a frame that includes a pivotably connected drive mount and a rotatable wheel supported by the drive mount. The blade extends about the rotatable wheel. A tensioner is used to set the blade tension so as to minimize objectionable noise and vibration. The tensioner also facilitates raising the drive mount and support wheel for blade removal.

13 Claims, 4 Drawing Sheets

BAND SAW APPARATUS WITH BLADE TENSIONER AND RELATED METHOD

FIELD OF THE INVENTION

The present invention relates to tensioning mechanisms and more particularly to a tensioner assembly installable in a food product band saw apparatus for tensioning of a band saw blade.

BACKGROUND OF THE INVENTION

In the food processing industry large upright band saws such as band saw 10 of FIG. 1 are commonly used for cutting meat products of a variety of sizes. Such band saws typically include a frame 12 upon which is mounted a support surface 14 for positioning meat products to be cut. A housing portion 16 extends above support surface 14 and a housing portion 18 extends below support surface 14. A band saw blade 20 passes though a plane defined by support surface 14 and extends around wheel members (not shown) located with housing portions 16 and 18 for being drivingly rotated by such wheel members. In particular, a drive motor 22 may be connected for rotating a drive wheel in housing portion 18.

In the food processing industry the band saw, including the blade, has to be cleaned each day and each time the food product being cut is changed. Therefore, such band saws preferably include a system which allows easy removal of the saw blade and simple reinstallation and retensioning the saw blade. Further, food product band saws preferably run as quiet as possible since they may operate in supermarket settings. As the noise produced by the band saw can vary according to the tension of the saw blade, it is desirable to enable a user to establish the appropriate saw blade tension in a simple manner. A properly configured tensioner and tensioning system may achieve the above goals.

A tension of the band saw blade may be adjusted by adjusting the position of a drive mount which supports the drive motor 22 and accordingly the drive wheel in housing portion 18. Referring to FIG. 2, and exemplary drive mount 24 is illustrated and is pivotably connectable to a frame 26 of the band saw by pivot pin 28. The drive motor 22 is connected to the drive mount and a drive shaft extends to the lower drive wheel 30 for rotation and support thereof. Thus, the lower drive wheel 30 is also supported by the drive mount 24. A tensioner 32 may be connected between the drive mount 24 at connection point 34 and the frame at a connection point 36, enabling adjustment of the pivotable position of the drive mount 24 and thus the position of the lower drive wheel 30 and/or the tension force of a saw blade 20 extending thereabout.

Tensioner 32 represents a known prior art tensioner which is illustrated schematically in FIG. 3 and includes a mounting bushing 38 with a shaft 40 extending therethrough. A mounting nut 42 is threaded onto the shaft 40 and a spring 44 extends from the mounting bushing 38 to the mounting nut 42. A handle 46 enables rotation of the shaft 40. In operation the mounting bushing 38 is connected to connection point 36 of the frame and the mounting nut 42 is connected to connection point 34 of the drive mount 24. Spring 44 provides a shock and vibration absorbing feature for the lower drive wheel 30 and associated drive motor 22. Tension on the blade (represented schematically at 48) is increased by rotating handle 46 to increase the distance between the mounting bushing 38 and the mounting nut 42. The spring 44 is pre-compressed to assure the blade 48 is properly tensioned when the mounting nut 42 is positioned at the far end of the threaded shaft 40. The pre-compressed force on spring 44 is typically very large since the blade 48 needs a large tension force. To maintain the condition where the handle 46 abuts against the mounting bushing 38 at all times, the spring 44 must be compressed at all times. Unfortunately the compressive force of the spring 44 is largest when the blade 48 is placed in the slack, non-tensioned condition resulting in high spring forces which must be overcome in order to remove the blade 48.

In order to remove a saw blade from a band saw the lower drive wheel 30 must be raised by rotating handle 46 to decrease the distance between the mounting bushing 38 and the mounting nut 42. With the above tensioner 32 arrangement in order to decrease the distance between the mounting bushing 38 and the mounting nut 42 the compression force of the spring 44 must be overcome. Further, the downward weight of the drive motor 22 and lower drive wheel must also be overcome. Accordingly, rotation of the handle 46 can be difficult.

Accordingly, in one embodiment, the present invention is directed to an improved tensioner assembly.

SUMMARY OF THE INVENTION

A tensioner assembly includes a mounting bushing having an opening therethrough and a shaft having at least one threaded region along its axial length, the shaft extending through the opening. A mounting nut is threaded onto the shaft. A seating surface extends from the shaft at a position intermediate the mounting bushing and the mounting nut. A spring is disposed around the shaft between the mounting bushing and the seating surface. A first end of the spring is positioned against the seating surface so as to be fixed at the intermediate position along the shaft regardless of a distance between the mounting bushing and the mounting nut, a second end of the spring is positioned toward the mounting bushing.

In another embodiment a method of tensioning a blade of a band saw apparatus including a frame, a drive mount including a first portion pivotably connected to the frame, a rotatable wheel supported by the drive mount and movable therewith, the blade extending about said rotatable wheel, involves: (a) providing a tension bolt assembly including a mounting bushing having an opening therethrough, a shaft extending through the opening and having at least one threaded region along its axial length, a mounting nut threaded onto the threaded region of the shaft and spaced from the mounting bushing, a spring disposed around the shaft and positioned between the mounting bushing and the mounting nut, a first end of the spring positioned against a seating surface located intermediate the mounting bushing and the mounting nut such that said first end of said spring is spaced from the mounting nut, a second end of the spring positioned against a first side of the mounting bushing; (b) connecting the mounting bushing to the frame; (c) connecting the mounting nut to a second portion of the drive mount; and (d) rotating the shaft until the shaft moves through the mounting bushing opening and the spring is compressed, such that a tension force of the blade is balanced with a compression force of the spring.

DETAILED DESCRIPTION

Figure 4:
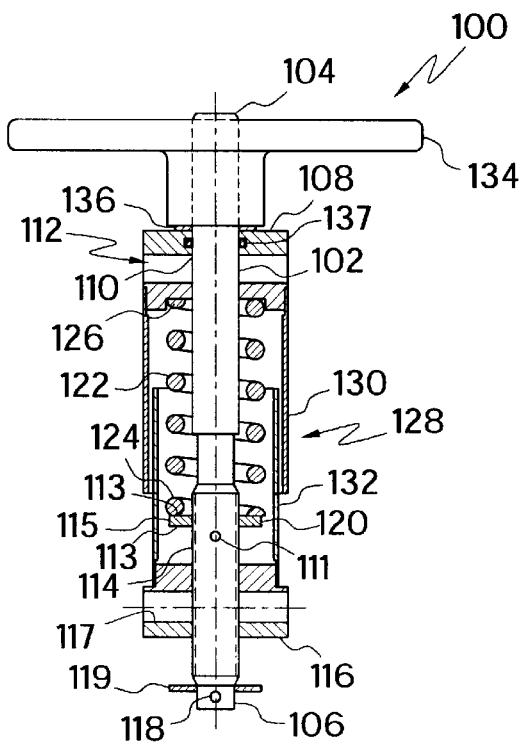
FIG. 4 is a cross-sectional view of one embodiment of a tension assembly of the present invention, in a non-tensioning configuration.
Figure 5:
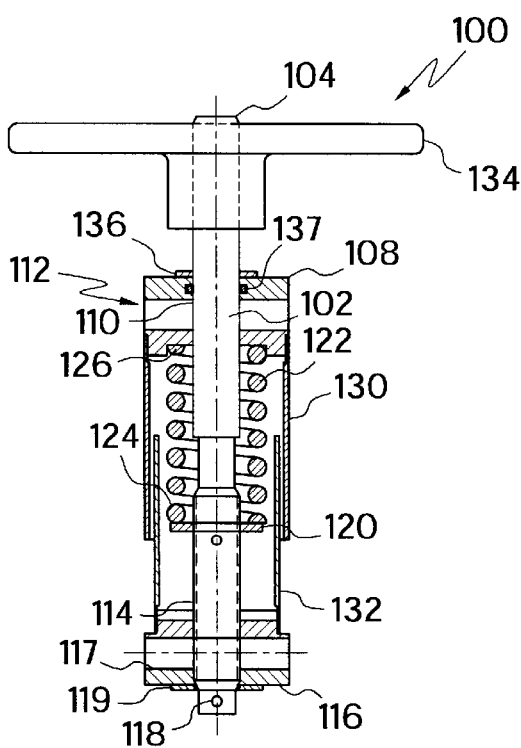
FIG. 5 is a cross-sectional view of the tensioner assembly of FIG. 4 in a tensioning configuration.

Referring to drawing FIGS. 4 and 5, numeral 100 depicts one embodiment of a tensioner assembly of the present invention. The tensioner assembly 100 includes a shaft 102 having first and second ends 104 and 106. A mounting bushing 108 includes an opening 110 therethrough. The shaft 102 extends through opening 110. Mounting bushing 108 also includes a laterally extending bore 112 for facilitating attachment of the mounting bushing 108 to a connection point such as connection point 36 shown in FIG. 2. Towards the end 106 of shaft 102 a threaded region 114 is provided and a mounting nut 116 is threaded onto the threaded region 114 to be spaced from mounting bushing 108. Relative rotation between shaft 102 and mounting nut 116 increases or decreases the distance between mounting bushing 108 and mounting nut 116 depending upon the direction of relative rotation. Laterally extending pin 118 and washer 119 may be provided for preventing mounting nut 116 from being threaded off of the shaft 102. Mounting nut 116 includes a laterally extending bore 117 for facilitating attachment to a drive mount connection point such as point 34 of FIG. 2.

A seating surface 120 is provided at a position intermediate the mounting bushing 108 and the mounting nut 116. The seating surface 120 may be provided by a laterally extending pin 111 with two washers 113 with a thrust needle bearing 115 positioned therebetween for facilitating relative rotation of the washers 113, but it is also anticipated that the seating surface 120 could be provided by other means including an additional nut located on threaded region 114, or even an integral extension of shaft 102. A spring 122 is disposed around shaft 102 and extends from mounting bushing 108 to seating surface 120. A first end 124 of the spring being positioned against seating surface 120 and a second end 126 of the spring 122 being positioned against a side of the mounting bushing 108. A housing 128 formed by telescoping portions 130 and 132 is also provided. A handle 134 is positioned toward end 104 of shaft 102 for rotating the shaft 102 and may be connected to the shaft by any known means such as a pinned connection. A thrust bearing 136 may be provided between handle 134 and mounting bushing 108 to facilitate rotation of the handle when in the FIG. 4 position. Thrust bearing 136 could be a plastic washer which provides a smooth surface against which the handle 134 abuts.

FIG. 4 illustrates the tensioner assembly 100 in a first configuration when a non-tensioned state while FIG. 5 illustrates the tensioner assembly 100 in a second configuration when in a tensioning state. In the non-tensioned configuration of FIG. 4 spring 122 is preferably in a normal, non-compressed state to facilitate easy rotation of handle 134. However, it is recognized that spring 122 may be precompressed when in the non-tensioned configuration.

Figure 1:
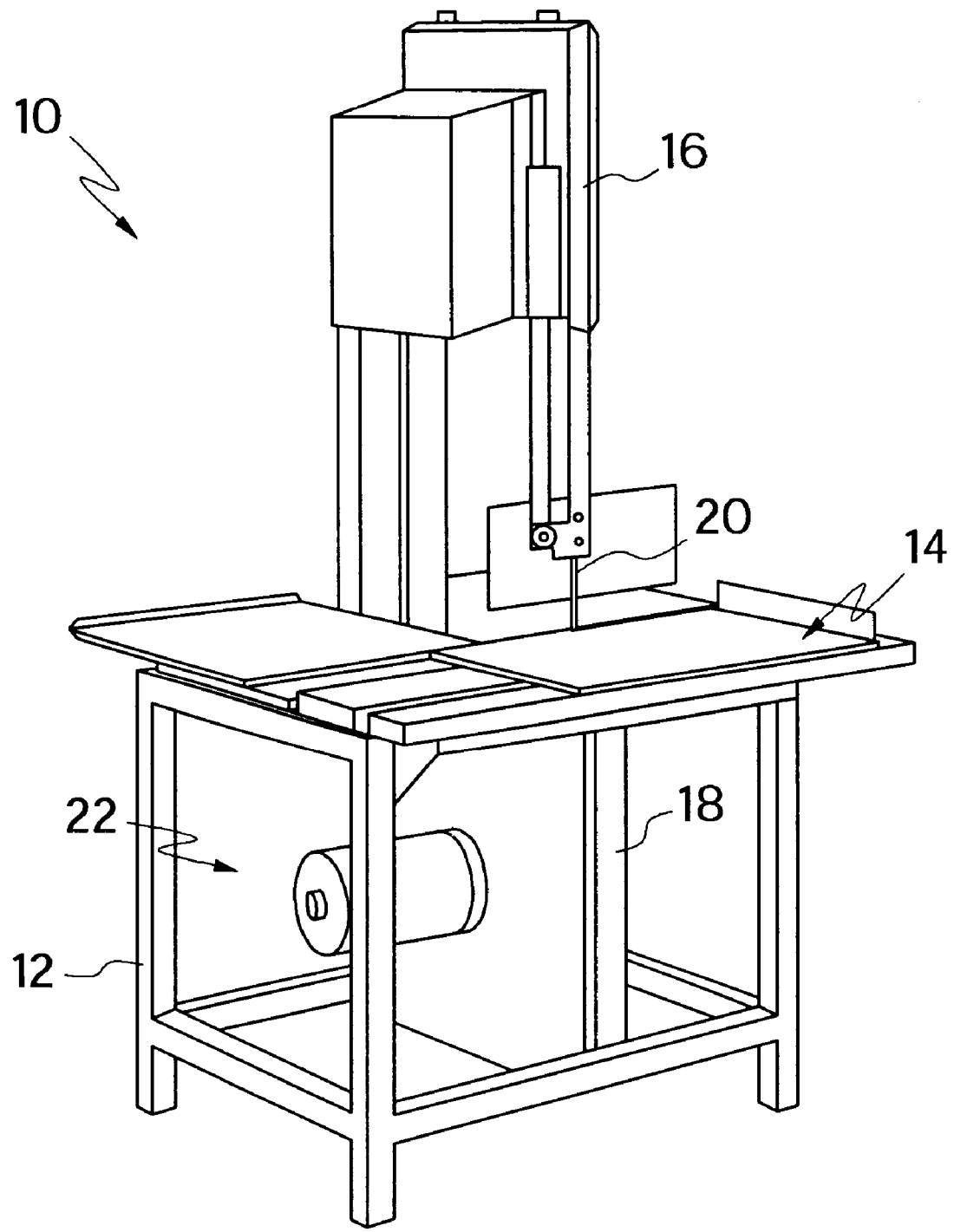
FIG. 1 is a perspective view of an exemplary food product band saw.
Figure 2:
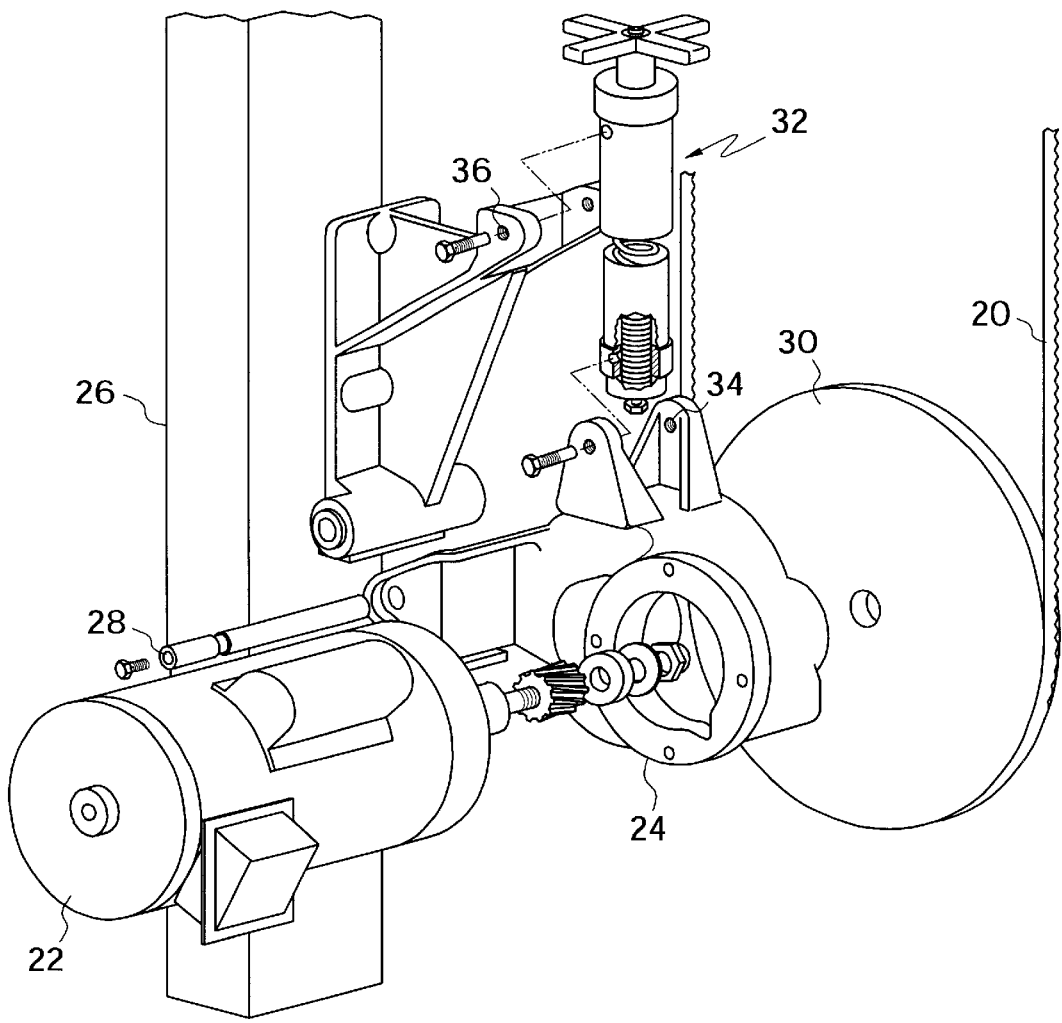
FIG. 2 is a partial perspective view of a drive mount arrangement.

When the tensioner assembly 100 is used in a band saw apparatus or other system in which tensioning is desired, the mounting bushing 108 is connected to a first connection point which is preferably a fixed connection point such as connection point 36 shown in FIG. 2. Mounting nut 116 is connected to a second connection point which is preferably a movable connection point such as connection point 34 of the drive mount 24 shown in FIG. 2. Once attached to their respective connection points neither mounting bushing 108 nor mounting nut 116 are rotatable. When first attached, the tensioner assembly 100 will be in the non-tensioned configuration of FIG. 4. In order to apply tension to a blade of a band saw, handle 134 is rotated to cause mounting nut 116 to move toward first end 106 of shaft 102 thereby increasing the distance between mounting bushing 108 and mounting nut 116. When the mounting nut 116, and accordingly the drive mount 24, drive motor 22 and lower drive wheel 30 of a band saw are moved sufficient to reach the length limit of the band saw blade, tensioning of the blade will begin and further rotation of the handle 134 causes a proportional amount of compressive force to be exerted on the spring 122. As the tension in the band saw blade is increased the compressive force against the spring 122 likewise increases and the spring 122 is compressed causing the shaft 102 to move axially upward through the mounting bushing 108. Once the handle 134 is moved away from the mounting bushing 108 (as shown in FIG. 5) the tension force on the band saw blade balances with the compression force on the spring 122. In this tensioned state, spring 122 provides a shock and vibration absorbing feature. The vibration comes from the motor and the blade, and the shock is caused by the blade cutting the food product.

Figure 3:
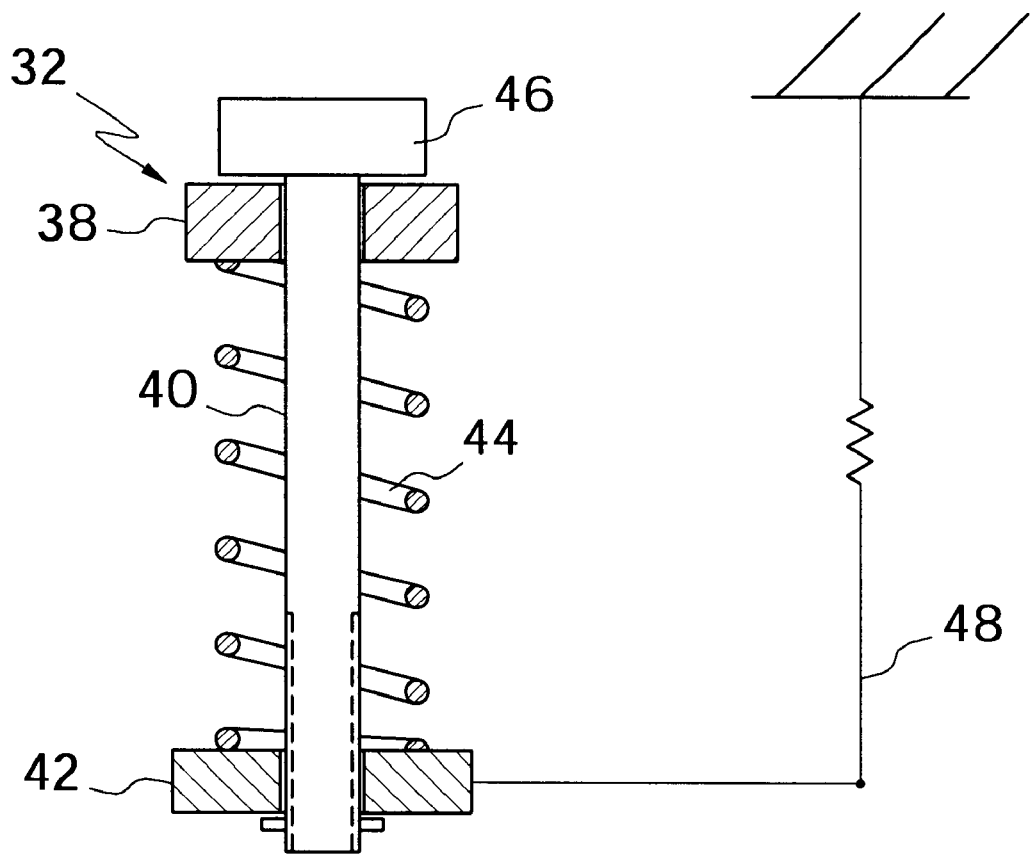
FIG. 3 is a schematic view of a prior art tensioner.

Notably, when it is desired to release the tension on the band saw blade to permit removal of the blade for cleaning, replacement or repair, the handle 134 is rotated in an opposite direction and the shaft 102 will move downward through the opening 110 in mounting bushing 108 until the handle 134 is again positioned adjacent the mounting bushing 108 (as shown in FIG. 4). During the downward movement of the handle 134 since the compressed spring 122 is being released the rotation of the handle 134 is very easy. From that point, further rotation of the handle 134 causes the mounting nut 116 to move upward along the shaft 102 towards end 104 and thus correspondingly pulls up the drive mount 24 and the attached drive wheel 30. As the drive mount 24 is pulled upward due to its attachment to mounting nut 116, spring 122 applies no forces which must be overcome and thus rotation of handle 134 is significantly easier as compared to the prior art tensioner 32 described above with reference to FIG. 3. This result is achieved by providing the seating surface 120 against which the end 124 of spring 122 is positioned so as to be fixed relative to the shaft 102 regardless of the distance between mounting nut 116 and mounting bushing 108.

When tensioner assembly 100 is in the tensioning configuration of FIG. 5 a distance between the seating surface 120 and the mounting bushing 108 is less than the distance between the seating surface 120 and the mounting bushing 108 when the tensioner assembly 100 is in the non-tensioning configuration of FIG. 4. When the tensioner assembly 100 is in the tensioning configuration of FIG. 5 a distance between the handle 134 and mounting bushing 108 is greater than the distance between the handle 134 and mounting bushing 108 when in the tensioning configuration of FIG. 4.

Another feature provided in the illustrated embodiment is that the blade tension does not need to be adjusted when the blade is retensioned using tensioner assembly 100. When the nut 116 reaches the far end 106 of shaft 102 as shown in FIG. 5, the compression force of the spring 122 is fixed, and so is the blade tension. Thus, the user/installer turns the handle 134 to its stopping point (when mounting nut 116 contacts the stop surface at end 106 of shaft 102) and at that time the blade tension will be set appropriately. To release the tension and raise the lower drive wheel for blade removal, the user/installer rotates the handle 134 in the opposite direction to its stopping point (when the mounting nut 116 contacts the pin 111). O-ring 137 provides a seal between the shaft 102 and the mounting bushing 108 to prevent entry of food product contaminants and any other liquids.

Although the invention has been described and illustrated in detail it is to be clearly understood that the same is intended by way of illustration and example only and is not intended to be taken by way of limitation. For example, the configuration of the mounting bushing, mounting nut, handle and shaft could vary considerably.

What is claimed is:

1. A band saw apparatus including a blade under tension, comprising:
   a frame;
   a drive mount including a first portion pivotably connected to said frame;
   a rotatable wheel supported by said drive mount and movable therewith, the blade extending about said rotatable wheel;
   a tensioner assembly including:
      a mounting bushing having an opening therethrough;
      a rotatable shaft having at least one threaded region along its axial length, said shaft extending through said opening in said mounting bushing;
      a handle connected to said shaft for rotating said shaft;
      a mounting nut threaded onto said threaded region of said shaft and spaced from said mounting bushing, said mounting nut including at least one laterally extending bore;
      a seating surface extending from said shaft at a position intermediate said mounting bushing and said mounting nut;
      a spring disposed around said shaft and positioned between said mounting bushing and said seating surface, a first end of said spring positioned against said seating surface so as to be fixed at said intermediate position along said shaft regardless of a distance between said mounting bushing and said mounting nut, a second end of said spring positioned toward said mounting bushing;
      a housing positioned between said mounting bushing and said mounting nut for enclosing said spring, said housing comprised of first and second telescoping portions, said housing positioned such that said laterally extending bore of said mounting nut is exposed;
   wherein a portion of said tensioner is connected to said frame; and
   wherein said mounting nut is connected to said drive mount via its laterally extending bore.

2. The apparatus of claim 1 wherein the tensioner assembly further includes a lower stop member positioned toward one end of said shaft for preventing movement of the mounting nut off of said shaft and an intermediate stop member for preventing movement of the mounting nut beyond said intermediate position toward said mounting bushing.

3. The apparatus of claim 1 wherein the tensioner assembly further includes a bearing member positioned around said shaft intermediate said mounting bushing and said handle for facilitating rotation of said handle when positioned thereagainst.

4. A band saw apparatus including a blade under tension, comprising:
   a frame;
   a drive mount including a first portion pivotably connected to said frame;
   a rotatable wheel supported by said drive mount and movable therewith, the blade extending about said rotatable wheel;
   a tensioner assembly including:
      a mounting bushing having an opening therethrough aligned with a longitudinal axis of the tensioner, the mounting bushing including at least one laterally extending bore;
      a shaft having at least one threaded region along its axial length, said shaft extending through said opening in said mounting bushing;
      a mounting nut threaded onto said threaded region of said shaft and spaced from said mounting bushing, said shaft being rotatable relative to said mounting nut;
      a spring disposed around said shaft and positioned between said mounting bushing and said mounting nut, a first end of said spring positioned against a seating surface located intermediate said mounting bushing and said mounting nut such that said first end of said spring is spaced from said mounting nut, a second end of said spring positioned toward said mounting bushing;
      a handle connected to said shaft for rotating said shaft;
      wherein a compression force on said spring varies as a distance between said mounting nut and said handle varies;
      a housing positioned between said mounting bushing and said mounting nut for enclosing said spring, said housing comprised of first and second telescoping portions, said housing positioned such that said laterally extending bore of said mounting bushing is exposed;
   wherein said mounting bushing is connected to said frame via its laterally extending bore; and
   wherein said mounting nut is connected to said drive mount.

5. The apparatus of claim 4 wherein said tensioner assembly further includes:
   a seal positioned between the mounting bushing and the shaft.

6. A band saw apparatus including a blade under tension, comprising:
   a frame;
   a drive mount including a first portion pivotably connected to said frame;
   a rotatable wheel supported by said drive mount and movable therewith, the blade extending about said rotatable wheel;
   a tensioner assembly including:
      a mounting bushing having an opening therethrough aligned with a longitudinal axis of the tensioner, the mounting bushing including at least one laterally extending bore;
      a shaft having at least one threaded region along its axial length, said shaft extending through said opening in said mounting bushing and sized for movement of said shaft through said opening;
      a mounting nut threaded onto said threaded region of said shaft and spaced from said mounting bushing, said mounting nut and said shaft being rotatable relative to one another to cause a corresponding relative axial movement between said mounting nut and said shaft, said mounting nut including at least one laterally extending bore;

a spring disposed around said shaft and positioned between said mounting bushing and said mounting nut, a first end of said spring positioned against a stationary seating surface that is in a fixed position along said shaft and that is located intermediate said mounting bushing and said mounting nut such that said first end of said spring is spaced from said mounting nut, a second end of said spring positioned against a first side of said mounting bushing; and a handle connected to said shaft and positioned to a second side of said mounting bushing for rotating said shaft;

wherein said mounting bushing is connected to said frame via its laterally extending bore; and wherein said mounting nut is connected to said drive mount via its laterally extending bore.

7. The apparatus of claim 6 wherein said tensioner assembly further includes:

a seal positioned between the mounting bushing and the shaft.

8. A band saw apparatus including a blade under tension, comprising:

a frame;

a drive mount including a first portion pivotably connected to said frame;

a rotatable wheel supported by said drive mount and movable therewith, the blade extending about said rotatable wheel;

a tensioner assembly including:

a mounting bushing having an opening therethrough aligned with a longitudinal axis of the tensioner, the mounting bushing including at least one laterally extending bore;

a shaft having at least one threaded region along its axial length, said shaft extending through said opening in said mounting bushing and sized for movement of said shaft within said opening;

a mounting nut threaded onto said threaded region of said shaft and spaced from said mounting bushing, said mounting nut including at least one laterally extending bore;

a seating surface extending from said shaft at a position intermediate said mounting bushing and said mounting nut;

a spring disposed around said shaft and positioned between said mounting bushing and said seating surface, a first end of said spring positioned against said seating surface that is in a fixed position so as to be fixed at said intermediate position along said shaft regardless of a distance between said mounting bushing and said mounting nut, a second end of said spring positioned against a first side of said mounting bushing;

wherein said shaft includes a handle positioned to a second side of said mounting bushing for facilitating rotation of said shaft by hand;

a housing positioned between said mounting bushing and said mounting nut for enclosing said spring, said housing comprised of first and second telescoping portions, said housing positioned such that both said laterally extending bore of said mounting bushing and said laterally extending bore of said mounting nut are exposed;

wherein said mounting bushing is connected to said frame via its laterally extending bore; and wherein said mounting nut is connected to said drive mount via its laterally extending bore.

9. The apparatus of claim 8 wherein said seating surface of said tensioner assembly comprises a washer held in place by a pin extending through said shaft.

10. The apparatus of claim 8 wherein a force exerted on said shaft sufficient to compress said spring results in movement of said handle away from said mounting bushing.

11. A band saw apparatus including a blade, comprising:

a frame;

a drive mount including a first portion pivotably connected to said frame;

a rotatable wheel supported by said drive mount and movable therewith, a blade extending about said rotatable wheel;

a tensioner assembly including:

a mounting bushing having an opening therethrough, said mounting bushing connected to said frame;

a shaft having at least one threaded region along its axial length, said shaft extending through said opening in said mounting bushing;

a mounting nut threaded onto said threaded region of said shaft and spaced from said mounting bushing, said shaft being rotatable relative to said mounting nut, said mounting nut connected to support said drive mount;

a spring disposed around said shaft and positioned between said mounting bushing and said mounting nut, a first end of said spring positioned against a seating surface that is in a fixed position along said shaft and that is located intermediate said mounting bushing and said mounting nut such that said first end of said spring is spaced from said mounting nut, a second end of said spring positioned toward said mounting bushing, said spring being compressed from its normal state;

a handle connected to said shaft and positioned to a second side of said mounting bushing for rotating said shaft, said handle being spaced from said mounting bushing; and wherein a tension force on the blade is proportional to a compressive force of said spring.

12. The band saw apparatus of claim 11 wherein the compression force on said spring increases as said mounting nut moves further away from said handle.

13. A band saw apparatus, comprising:

a frame;

a drive mount including a first portion pivotably connected to said frame;

a rotatable wheel supported by said drive mount and movable therewith;

a blade extending about said rotatable wheel;

a tensioner assembly including:

a mounting bushing connected to the frame;

a rotatable shaft having at least one threaded region along its axial length, said shaft extending through said opening in said mounting bushing;

a handle connected to rotate said shaft;

a mounting nut threaded onto said threaded region of said shaft and spaced from said mounting bushing, said mounting nut connected to the drive mount;

a seating surface extending from said shaft at a position intermediate said mounting bushing and said mounting nut, said position of said seating surface fixed along said shaft;

a spring disposed around said shaft and positioned between said mounting bushing and said seating surface, a first end of said spring positioned against said seating surface so as to be fixed at said intermediate position along said shaft regardless of a distance between said mounting bushing and said mounting nut, a second end of said spring positioned toward said mounting bushing;

wherein rotation of said shaft in a first direction lowers said drive mount to move said rotatable wheel away from said mounting bushing to tension the blade and rotation of said shaft in a second direction lifts said drive mount to move said rotatable wheel toward said mounting bushing to release tension on the blade and to allow the blade to be removed.

* * * * *